Sept. 14, 1965 H. J. CULLIN 3,206,538
HERMETIC SEAL HEADER WITH OFFSET SKIRT-CASING WELD
Filed June 14, 1962 2 Sheets-Sheet 1
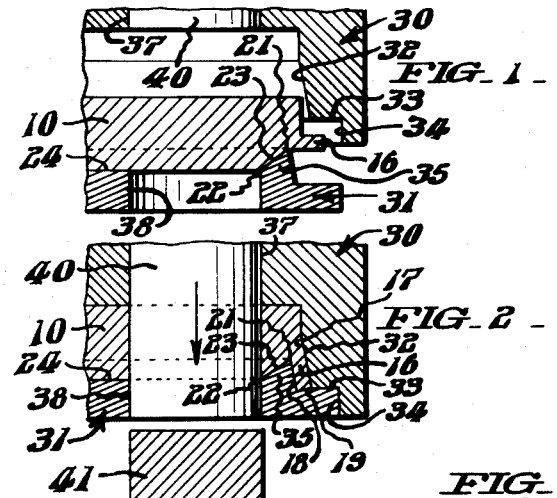
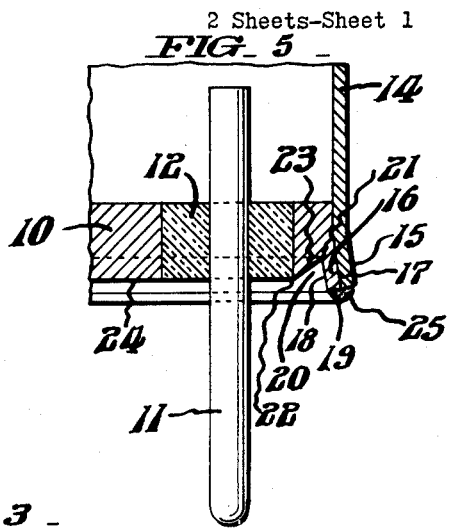
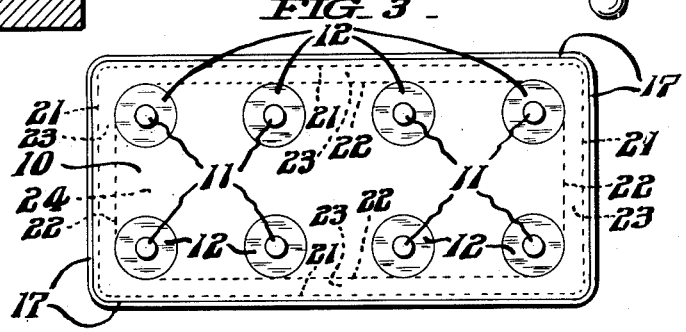
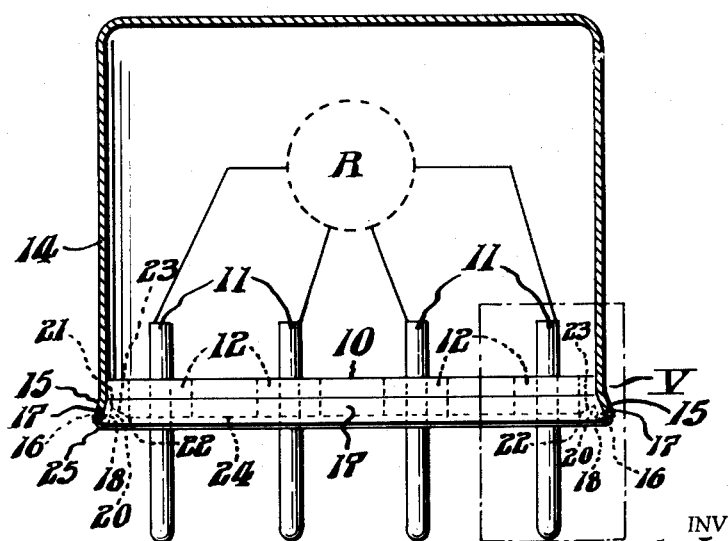
INVENTOR.
Hugh J. Cullin,
BY
Paul & Paul
ATTORNEYS.

Sept. 14, 1965 H. J. CULLIN 3,206,538
HERMETIC SEAL HEADER WITH OFFSET SKIRT-CASING WELD
Filed June 14, 1962 2 Sheets-Sheet 2
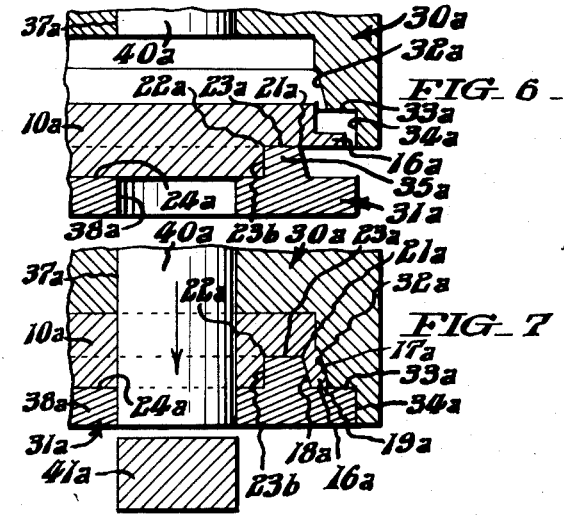
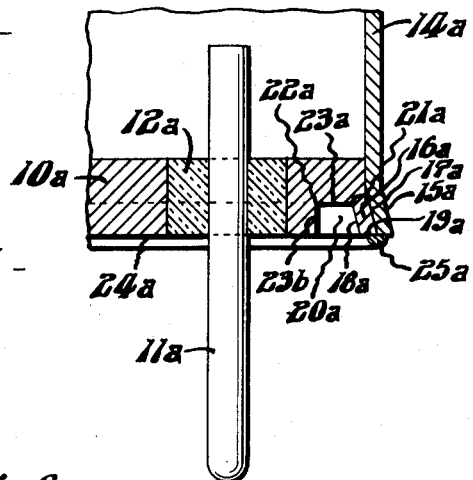
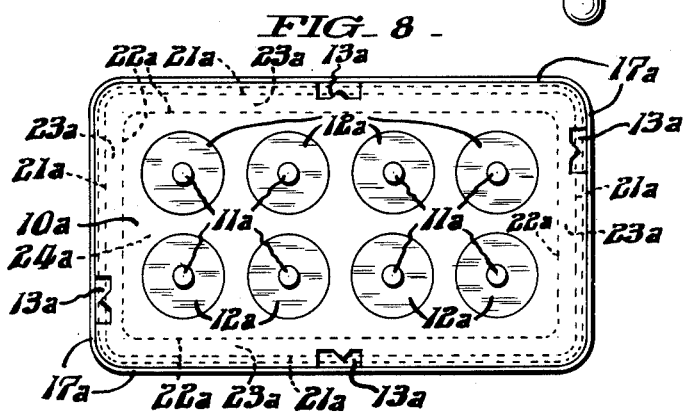
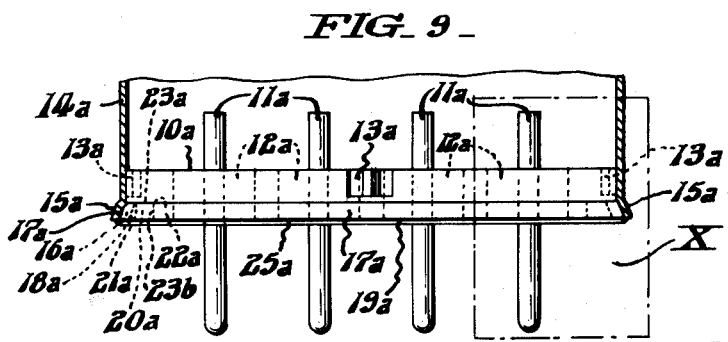
INVENTOR.
Hugh J. Cullin,
BY
Paul & Paul
ATTORNEYS.

United States Patent Office 3,206,538
Patented Sept. 14, 1965

3,206,538
HERMETIC SEAL HEADER WITH OFFSET
SKIRT-CASING WELD
Hugh J. Cullin, Glassboro, N.J., assignor to Struthers-Dunn, Inc., Pitman, N.J., a corporation of Pennsylvania
Filed June 14, 1962, Ser. No. 202,584
1 Claim. (Cl. 174—50.5)

This invention relates to relays and more particularly to a hermetic header construction therefor.

In the production of electrical relays for use in missiles, satellites and for other special environments, it is essential to provide a hermetic seal between the header of the relay and the outer casing or can which surrounds it. A solder seal is unsatisfactory since the use of solder requires flux, some of which may enter the relay or contaminate the contacts thereof, causing defective operation. Moreover, continued expansion and contraction of the elements of the relay, thermal shock, and the like, may cause the seal to shear, with consequent leakage of moisture into the envelope. It has been found that welding overcomes these problems, but welding encounters problems of its own. Among these is the heat of welding, which tends to fuse the glass compression seals which surround the terminals that extend through the header.

In the welding operation, the header plate (which is necessarily relatively thick for strength purposes) has been provided with a thin skirt turned up around its periphery, which skirt is of approximately the same thickness as the wall of the can. The skirt aids in delaying transfer of the heat produced by the welding process to the header, so that the aforementioned glass seals are not disturbed.

Military and other requirements have dictated a minimum overall vertical dimension for the relay. Any increase in the thickness of the header plate, and consequently in the overall length of the relay, presents a significant problem in meeting limiting specifications.

It is accordingly an object of this invention to overcome the foregoing problems.

It is another object of this invention to provide an improved header for electrical relays and the like, which is adapted for hermetic sealing to the casing of the relay without any substantial increase in the thickness thereof, and which may be successfully welded to said casing without damage to the glass compression seals of the header.

Other objects and attendant advantages of the invention will appear hereinafter and in the drawings wherein:

FIG. 1 is a view in section illustrating one stage of the process of forming an improved header in accordance with this invention;

FIG. 2 is a view in section showing another stage in the process of forming the header;

FIG. 3 is a bottom view of a relay having a header in accordance with this invention;

FIG. 4 is a view in side elevation of a relay, with the casing shown in section;

FIG. 5 is a magnified view of a part of the relay indicated by the area V in FIG. 4;

FIG. 6 is a view in section illustrating one stage in the process of formation of a modified form of the improved header as provided in accordance with this invention;

FIG. 7 is a view in section of another stage in the process of formation of the modified header;

FIG. 8 is a bottom view of the modified form of the header;

FIG. 9 is a fragmentary view partly in section and partly in elevation of the improved header mounted in a relay casing; and FIG. 10 is a magnified view in section of a part of the header and casing defined by the area X in FIG. 9.

The following description is directed to the specific forms of the invention illustrated in the drawings and is not intended to be addressed to the scope of the invention itself which may be practiced in a wide variety of forms and arrangements.

Adverting herewith to the specific forms of the invention illustrated in the drawings, in FIG. 3 is shown a header or terminal plate 10 of generally rectangular dimension, having a plurality of contact rods or terminals 11 which extend through the plate 10 and which are spaced in columns and rows. Each of the contact terminals 11 are surrounded by glass seals 12 which are melted into the space between the plate 10 and the terminals 11 and permitted to cool gradually and expand to produce a compression seal.

As may be seen in FIG. 4, the header plate 10 is mounted in a casing or can 14, which encloses an electrical relay mechanism R which may be of any known construction. The walls of the can 14 flare outwardly at the point 15 adjacent the generally rectangular opening of the can.

As may best be seen in FIGS. 4 and 5, the header plate 10 is provided with a peripheral skirt 16 having an outer side 17, an inner side 18 and an edge 19. It will be seen that the skirt 16 extends from the header plate 10 at an angle such as to fit snugly against the flared section 15 of the wall of the can 14. Inwardly of the header plate 10 immediately adjacent the peripheral skirt 16, there is formed a triangular groove 20, the width of which extends from the peripheral skirt 16 at the point 21 to the compression seal 12 at the point 22. It will be seen that the groove 20 is bounded by the inner wall 18 of the skirt 16 and by an oblique wall 23 beginning at the compression seal 12 and extending inwardly into the header plate 10 from the front surface 24 thereof to the inner wall 18 of the skirt 16. The juncture of the walls 18 of the skirt 16 and wall 23 forms the apex of the generally triangular groove 20.

A bead 25 formed by welding the skirt 16 to the wall of an can 14 at 15 extends around the periphery of the header plate 10 and the can 14, and seals the header plate to the can to provide a hermetic seal.

FIGS. 1 and 2 illustrate one method of forming the skirt and groove of the header as provided in accordance with this invention, wherein the header plate 10 is formed with an outwardly extending flange 16 and mounted between an upper die 30 and a lower die 31, which dies are suitably dimensioned to receive the header plate 10. Adjacent the periphery of the upper die 30 there is provided a tapered forming wall 32 below which there is also provided a generally rectangular space having forming walls 33 and 34. Adjacent the periphery of the lower die 31 there is provided a generally triangular forming section 35. Circular holes 37 and 38 are respectively provided in the dies 30 and 31. In the forming operation, the upper die 30 is brought downwardly toward the lower die 31 whereby the wall 33 of the upper die strikes the flange 16 pushing it downward while the forming wall 32 of the upper die 30 presses inwardly against the flange 16 to bring it into the position shown in FIG. 2, thereby forming the skirt 16 of the header plate 10. The triangular forming section 35 of the lower die fits into a coined-out section of the header plate adjacent the flange 16 so that it abuts the wall 23 of the header plate and when the upper die 30 is brought downwardly against the lower die 31 the flange or skirt 16 is pressed against the triangular forming section 35, thereby forming the groove 20 in the header plate 10. When the upper die 30 is brought downwardly against the lower die 31, a punch 40 powered by suitable means, such as hydraulically for example, is lowered through the respective upper and lower dies to punch out a circular section 41 from the header plate 10 to provide circular openings for the compression seals 12.

The modified form of the invention illustrated in FIGS. 6 through 10 is essentially similar to that appearing in FIGS. 1 through 5 and similar parts are designated by the same numbers followed by the letter "*a*." However, the groove 20*a* is substantially rectangular and is bounded by the inner wall 18*a* of the skirt 16*a*, by a wall 23*a* at the bottom of the groove, and a wall 23*b* disposed inwardly from the periphery of the header plate and perpendicular to the bottom wall of the groove. The groove 20*a* is open at the front surface 24*a* of the header plate 10*a*.

A bead 25*a* formed by welding the skirt 16*a* to the wall of the can 14*a* at 15*a* extends around the periphery of the header plate 10*a* and the can 14*a* and seals the header plate to the can to provide a hermetic seal.

FIGS. 6 and 7 illustrate a method of forming the skirt and groove of the modified header, which is similar to that appearing in FIGS. 1 and 2 but forms a groove of different shape, as stated above.

In accordance with the present invention, when the header plate 10 has been formed as aforedescribed, it may be seated into the open flared end of the casing 14 so that the skirt 16 abuts the flared section 15 of the can wall and thereafter the skirt 16 is welded to the flared section 15 of the wall of the can 14, preferably by tungsten unit gas welding wherein no rod is used and the metal of the skirt 16 and the can are melted in an arc surrounded by helium or argon wherein no oxygen is present so that a relatively small bead is formed by the melting of the welded material.

It will be evident that it is an important advantage of the invention that by means of the skirt and groove provided in the header plate as aforedescribed, the header plate may be welded to the outer casing of the relay or similar device to form a hermetic seal without any substantial increase in the width of the header plate itself, thereby effecting an important saving in the overall length of the relay.

Another advantageous feature of the invention lies in the construction of the header plate wherein the groove and skirt successfully delay the flow of heat to the compression seals during the welding process, thereby avoiding damage to the aforesaid seals.

Although this invention has been described with reference to specific forms and embodiments thereof, it will be evident that a great number of variations may be made without departing from the spirit and the scope of this invention. For example, parts may be reversed, equivalent elements may be substituted for those specifically disclosed, and certain features of the invention may be used independently of other features, all without departing from the spirit and scope of this invention as defined in the appended claim.

Having thus described my invention, I claim:

In a hermetically sealed electrical relay, the combination comprising a horizontally extending metallic header plate with its undersurface deeply recessed to set off a thick main body part of the plate from a comparatively thin peripherally extending skirt formed by said recess, the comparatively thin peripheral skirt extending downwardly from the header plate and on the outer side of said recess, at least one glass compression seal having a conductor extending therethrough and disposed in said thick main body part of the plate, a metallic casing covering said plate and glass compression seals and substantially uniform in horizontal section throughout the height thereof including a wall disposed in overlying spaced relation to said plate, and side walls depending from the first mentioned wall and embracing said skirt, the lower terminal edges of said skirt and side walls being disposed approximately on the plane of the undersurface of the main body part of said plate, and a continuous weld applied to said edges and sealing the same, the thick main body part of said plate dissipating the intense heat of welding applied to said comparatively thin skirt sufficiently to prevent damage therefrom to said glass compression seals.

References Cited by the Examiner

UNITED STATES PATENTS

| | | | |
|---|---|---|---|
| 2,277,871 | 3/42 | Mitchell et al. | 220—2.3 |
| 2,299,772 | 10/42 | Suits | 174—17.07 X |
| 2,446,271 | 8/48 | Eitel | 174—17.07 |
| 2,490,087 | 12/49 | Pakala | 220—2.3 X |
| 2,749,403 | 6/56 | Horman et al. | 174—50.54 X |

OTHER REFERENCES

Wyzeenbeek, A.: "Hermetic Feed Through Terminals," pp. 129–131, in Electrical Manufacturing, January 1954.

DARRELL L. CLAY, *Primary Examiner.*

JOHN P. WILDMAN, E. JAMES SAX, *Examiners.*